(12) United States Patent
Lee et al.

(10) Patent No.: US 12,154,392 B2
(45) Date of Patent: Nov. 26, 2024

(54) STATE DIAGNOSIS APPARATUS AND METHOD OF MOVING SYSTEM PART

(71) Applicants: Hyundai Motor Company, Seoul (KR); Kia Corporation, Seoul (KR)

(72) Inventors: Dong-Chul Lee, Gyeonggi-do (KR); In-Soo Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/221,786

(22) Filed: Jul. 13, 2023

(65) Prior Publication Data

US 2024/0021029 A1  Jan. 18, 2024

Related U.S. Application Data

(63) Continuation of application No. 16/891,726, filed on Jun. 3, 2020, now Pat. No. 11,741,761.

(30) Foreign Application Priority Data

Jan. 6, 2020 (KR) .......................... 10-2020-0001447

(51) Int. Cl.
G07C 5/08 (2006.01)
G01H 1/00 (2006.01)
G06N 3/044 (2023.01)
G06N 3/045 (2023.01)
G06N 3/08 (2023.01)

(52) U.S. Cl.
CPC ........... G07C 5/0808 (2013.01); G01H 1/003 (2013.01); G06N 3/044 (2023.01); G06N 3/045 (2023.01); G06N 3/08 (2013.01)

(58) Field of Classification Search
CPC .... G07C 5/0808; G07C 5/008; G07C 5/0841; G01H 1/003; G01H 1/06; G06N 3/044; G06N 3/045; G06N 3/08; G06N 3/048; F02D 41/22; F02D 41/1497; F02D 2041/1433
See application file for complete search history.

(56) References Cited

U.S. PATENT DOCUMENTS

| 2019/0114849 | A1  | 4/2019 | Lee et al. |
| 2020/0026289 | A1* | 1/2020 | Alvarez ................. G07C 5/085 |
| 2020/0035244 | A1* | 1/2020 | Kim ........................ G06F 40/58 |
| 2020/0166398 | A1* | 5/2020 | Collister ............. G06F 11/3089 |

FOREIGN PATENT DOCUMENTS

| DE | 102017221701 A1 | 4/2019 | |
| KR | 20040038072 A | 5/2004 | |
| KR | 10-2013-0068717 A | 6/2013 | |
| KR | 101487614 B1 | 1/2015 | |
| KR | 20190042203 A | 4/2019 | |
| WO | WO-2017160889 A1 * | 9/2017 | ............. A61B 17/15 |
| WO | WO-2020214699 A1 * | 10/2020 | ............. G06F 16/26 |

* cited by examiner

*Primary Examiner* — Joseph J Dallo
(74) *Attorney, Agent, or Firm* — Fox Rothschild LLP

(57) ABSTRACT

A state diagnosis apparatus of a moving system part is provided and includes a sensor unit that measures and collects state data of a moving system part relevant to an engine. A graphic controller primarily diagnoses classification data generated by classifying the state data according to a predetermined filtering condition as a normal state or an abnormal state using a Deep Learning model.

18 Claims, 11 Drawing Sheets

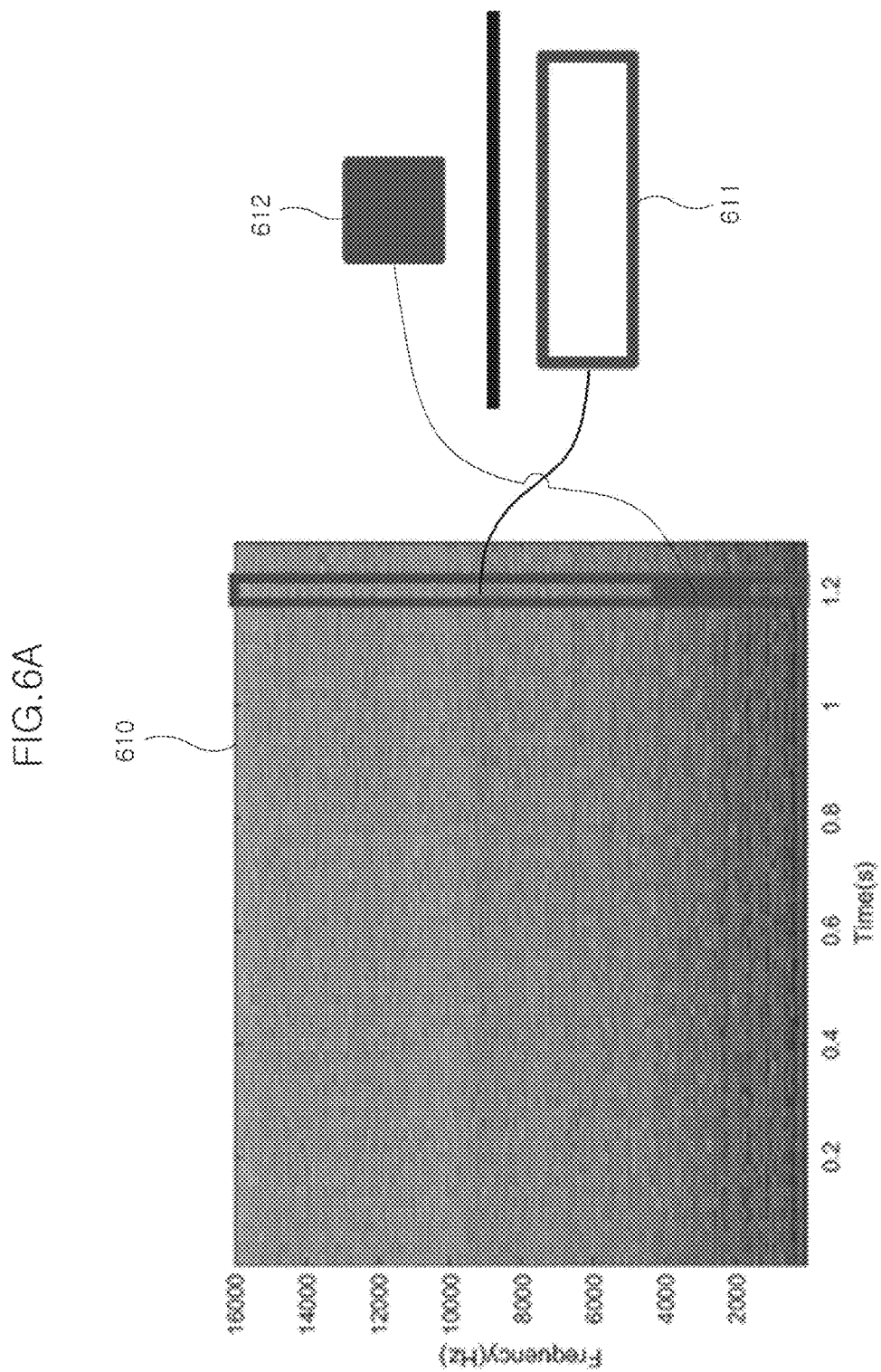

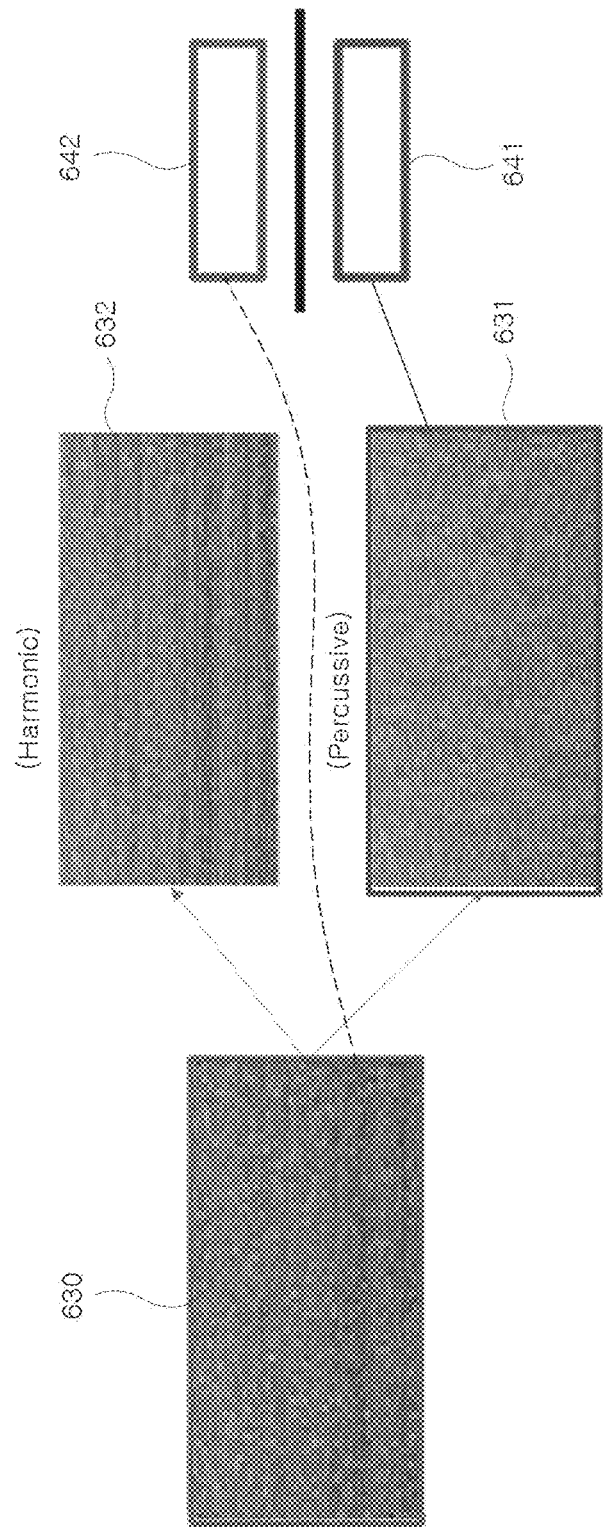

STATE DIAGNOSIS APPARATUS AND METHOD OF MOVING SYSTEM PART

CROSS-REFERENCE TO RELATED APPLICATION

This application is a continuation of U.S. Ser. No. 16/891,726 filed on Jun. 3, 2020, which claims priority to Korean Patent Application No. 10-2020-0001447, filed on Jan. 6, 2020, the entire contents of which are incorporated herein by reference.

BACKGROUND

Field of the Disclosure

The present disclosure relates to an engine noise control technology, and more particularly, to a state diagnosis apparatus and method of a moving system part using an artificial intelligence technology capable of more accurately diagnosing abnormality and abnormality of a specific part by using the percussive characteristic of a moving system that directly affects durability performance of an engine.

Description of Related Art

If an abnormal noise occurs in a vehicle, a technology in which a specialist directly measures and analyzes a vibration or noise signal to diagnose the cause is used. Therefore, there is a need to determine the cause through substantial data measurement and analysis experience. Further, even if the cause is determined, a substantial amount of data comparison is required to classify between the normality and abnormality of the corresponding part.

The contents described in this section are to help the understanding of the background of the present disclosure, and may include what is not previously known to those skilled in the art to which the present disclosure pertains.

SUMMARY

An object of the present disclosure is to provide a state diagnosis apparatus and method of a moving system part capable of more accurately diagnosing normal and abnormal states of a specific part by using the percussive characteristic of a moving system. Further, another object of the present disclosure is to provide a state diagnosis apparatus and method of a moving system part, which implement a diagnosis algorithm for classifying the percussive sound (e.g., representative noise characteristics determined as the abnormality) of a Noise, Vibration, Harshness (NVH) level of a vehicle in use to provide more accurate information to a user. Still another object of the present disclosure is to provide a state diagnosis apparatus and method of a moving system part capable of soft maintenance according to a NVH state.

For achieving the objects, the present disclosure provides a state diagnosis apparatus of a moving system part capable of more accurately diagnosing normal and abnormal states of a specific part by using the percussive characteristic of the moving system. The state diagnosis apparatus of the moving system part may include a sensor unit configured to measure and collect state data of a moving system part relevant to an engine; and a graphic controller configured to primarily diagnose classification data generated by classifying the state data according to a predetermined filtering condition as a normal state or an abnormal state through a Deep Learning model.

At this time, the state data includes noise data and vibration data of the moving system part. Further, the state includes are noise data and vibration data of the abnormal state generated by a failure of the moving system part, and noise data and vibration data by mileage according to the normal state of the engine. The state data may be collected when the engine is an idle condition and a predetermined constant speed.

Further, the Deep Learning model is a structure composed of Recurrent Neural Network (RNN), Attention Mechanism, and Deep Neural Network (DNN). The graphic controller may be configured to perform secondary diagnosis to calculate a normal level grade in response to diagnosing the normal state. The normal level grade is a value based on a Noise, Vibration, Harshness (NVH) level of the engine.

Additionally, the normal level grade may be expressed by an energy relative ratio in a frequency band in which percussive among the state data is generated larger than a predetermined reference value, an energy relative ratio in a frequency band which governs sound pressure of low frequency to high frequency bands, and a score summed by multiplying an extracted result value extracted by classifying only a percussive sound component in the corresponding frequency band by each weight. The extracted result value may be calculated using a Harmonic-Percussive Source Separation (HPSS) algorithm. The graphic controller may be configured to execute a variable cylinder management (VCM) evaluation mode which adds an acceleration condition for re-measuring the state information.

Another exemplary embodiment of the present disclosure provides a state diagnosis method of a moving system part that may include collecting, by a sensor unit, state data of a moving system part relevant to an engine; classifying, by a graphic controller, the state data according to a predetermined filtering condition to generate classification data; and primarily diagnosing, by the graphic controller, the classification data as a normal state or an abnormal state through a Deep Learning model.

Further, the state diagnosis method may include performing, by the graphic controller, secondary diagnosis for calculating a normal level grade, in response to diagnosing the normal state. The state diagnosis method may include executing, by the graphic controller, a variable cylinder management (VCM) evaluation mode which adds an acceleration condition for re-measuring the state information.

According to the present disclosure, it may be possible to diagnose the normality/abnormality (failure) of the moving system, which causes a problem in the durability performance of the engine, with improved accuracy through the primary Deep Learning technique. Another effect of the present disclosure is that it may be possible to provide information by classifying the Noise, Vibration, Harshness (NVH) level of the vehicle recognized by the user for each normal state condition based on the percussive sound component among the abnormal noise characteristics of the moving system. Additionally, another effect of the present disclosure is that it may be possible to apply a technology of determining the state by using a Harmonic-Percussive Source Separation (HPSS) technique which extracts the energy density ratio in the frequency band with strong percussive generation, the energy density ratio in the frequency band governing the sound pressure (the NVH level recognized by a general customer), and only the periodic noise component which generates the percussive from the measured noise or vibration component.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein:

FIGS. 6A to 6C are conceptual diagrams showing Noise, Vibration, Harshness (NVH) level diagnosis of a normal state according to an exemplary embodiment of the present disclosure;

DETAILED DESCRIPTION

Figure 1:
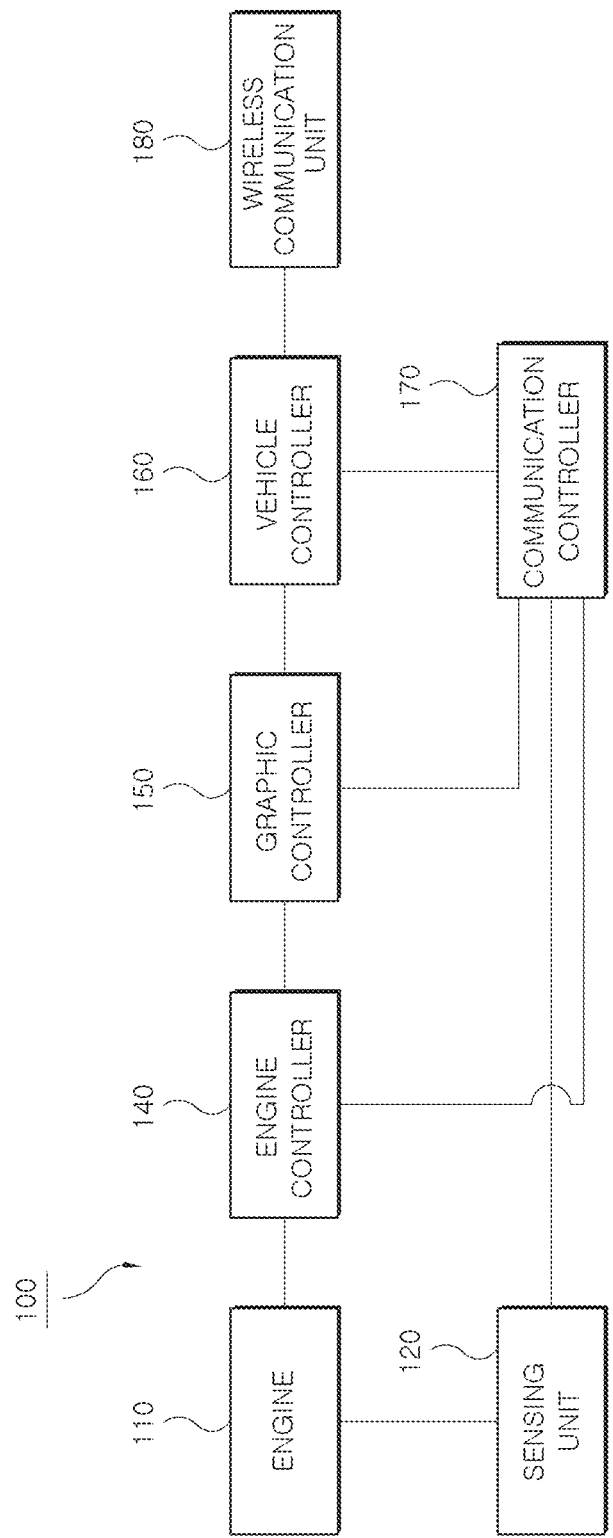
FIG. 1 is a block diagram showing a configuration of a state diagnosis apparatus of a moving system part according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various modifications and various exemplary embodiments may be made in the present disclosure, so that specific exemplary embodiments are shown in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like components in describing each drawing. The terms "first," "second," and the like may be used to illustrate various components, but the components should not be limited by the terms. The terms are used to differentiate one element from another. For example, a first component may be referred to as a second component, and similarly, the second component may also be referred to as the first component without departing from the scope of the present disclosure. The terms "and/or" includes any item of a combination of a plurality of related listed items or any of a plurality of related listed items.

Unless otherwise defined, all terms including technical and scientific terms used herein have the same meaning as commonly understood by those skilled in the art to which the present disclosure pertains. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a state diagnosis apparatus and method of a moving system part according to an exemplary embodiment of the present disclosure will be described in detail with reference to the accompanying drawings.

FIG. 1 is a block diagram showing a configuration of a state diagnosis apparatus 100 of a moving system part according to an exemplary embodiment of the present disclosure. Referring to FIG. 1, the state diagnosis apparatus 100 of the moving system part may include an engine 110, a sensing unit 120, an engine controller 140, a graphic controller 150, a vehicle controller 160, a communication controller 170, a wireless communication unit 180, and the like.

The engine 110 is a power unit which includes moving system parts. The moving system parts may include rotating bodies. For example, the engine 110 may be an internal combustion engine, an electric motor, a gas turbine, an electric generator, etc. For example, the moving system parts may be a piston, a transmission, a valve, a clutch, and the like. In the case of an internal combustion engine, the engine 110 may be Continuous Variable Valve Timing (CVVT), Double Over Head Camshaft (DOHC), Continuous Valve Timing (CAT), Gasoline Direct Injection (GAI), and Multi Point Injection (MPI) engines which use gasoline as fuel, Common Rail Direct Injection (CRDI), High direction Turbo Intercooler (HTI), and Variable Geometry Turbocharge (VGT) engines which use diesel as fuel, a Liquid Propane injection (LPi) engine which uses gas as fuel, or the like.

The sensing unit 120 collectively refers to sensors, and may be configured to generate vibration data and noise data of moving system parts of the engine 110. In other words, the sensing unit 120 may be configured to generate the vibration data and the noise data by installing a vibration sensor, a noise sensor, and the like corresponding to the moving system parts among the parts configured in the engine.

Although FIG. 1 shows the sensing unit 120 separately from the engine 110 block for understanding, the sensing unit 120 may be formed integrally with the engine 110. The engine controller 140 may be configured to adjust the output of the engine 110 according to an operation of a vehicle controller. Further, the engine controller 140 may be configured to generate engine control data relevant to an operation of the engine 110.

Engine control data, in-vehicle communication message data (e.g., Controller Area Network (CAN) data), environmental data, and the like may be collected using the sensing unit 120, the engine controller 140, and the like. The in-vehicle communication message data, the environmental data, and the like may be various state monitoring data of the engine. The engine data may be revolution per minute (RPM), cylinder information, displacement, and the like as data relevant to the engine.

The engine control data may be coolant temperature, oil temperature, air temperature, combustion pressure, and the like as data relevant to the control of the engine. The in-vehicle communication message data may include data relevant to an operation of an auxiliary device for the vehicle such as a mirror regulator (not shown), a sunroof (not shown), a power window (not shown), a seat adjuster (not shown), and the like as well as a control relevant to the operation of the vehicle such as an engine control, a transmission control, an Anti-lock Brake System (ABS) (not shown), an active suspension (not shown), and shifting.

The in-vehicle communication message data may include vehicle data and environmental data. Therefore, the environmental data are data except for the vehicle data. The environmental data may be operation information of an air conditioner, state information of a door, and the like. Further referring to FIG. 1, the sensing unit 120 may be configured to measure Noise, Vibration, Harshness (NVH) or the like in an engine room and a vehicle interior.

The graphic controller 150 may include a Graphic Processing Unit (GPU) and the like, and may be configured to perform diagnosis and prediction through Deep Learning based on big data. In other words, the graphic controller 150 may be configured to diagnose an abnormal state through the Deep Learning based on the big data composed of various abnormal noise and vibration data. Further, the graphic controller 150 may be configured to receive document information by searching the database for the corresponding abnormal state diagnosed by classifying the big data to provide the information to the driver.

To perform such Deep Learning, the graphic controller 150 may include a Graphic Process Unit (GPU). Thousands to tens of thousands of Arithmetic Logic Unit cores are disposed inside the GPU. Therefore, a concurrent parallel processing is possible. Further, the vehicle controller 160 may be configured to operate components for operating the vehicle. In particular, the vehicle controller 160 may be configured to acquire engine information from the engine controller 140 for operating the engine (not shown) using the graphic controller 150. The engine information may be an engine revolution per minute (RPM), an engine start-up, an idle state, and the like. The vehicle controller 160 may be an Electronic Control Unit (ECU), a Hybrid Control Unit (HCU), or the like. Although only the engine has been shown in FIG. 1, both the engine and a motor (not shown) may also be providing and only the motor may be providing. If the motor is provided, a motor controller (not shown) for operating the motor may be provided. The motor controller may an inverter, a converter, and the like to operate the motor.

The communication controller 170 may be configured to execute communication between components in the vehicle. The communication between the components may be connected by Multimedia-Controller Area Network (MM-CAN), Body-Controller Area Network (B-CAN), high-speed Controller Area Network (CAN), a communication line (for example, 500 kbps), a Flexible Data-Rate (CAN-FD) communication line, a Flexlay communication line, a Local Interconnect Network (LIN) communication line, a Power Line Communication (PLC) communication line, a Control Pilot (CP) communication line, or the like so that an upper controller delivers instructions to a lower controller while exchanging information between the controllers.

The wireless communication unit 180 may be configured to transmit data to the outside or receive the data from the outside. Accordingly, the wireless communication unit 180 may include a microprocessor, a communication circuit, and the like. Of course, although only the wireless communication unit 180 has been shown, wired communication is also possible.

Further, although a memory has not been shown in FIG. 1, the memory may be provided. The memory may include at least one type of storage medium among a flash memory type, a hard disk type, a multimedia card micro type, a card type memory (for example, Secure Digital (SD) or extreme Digital (XD) memory, or the like), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk.

Figure 2:
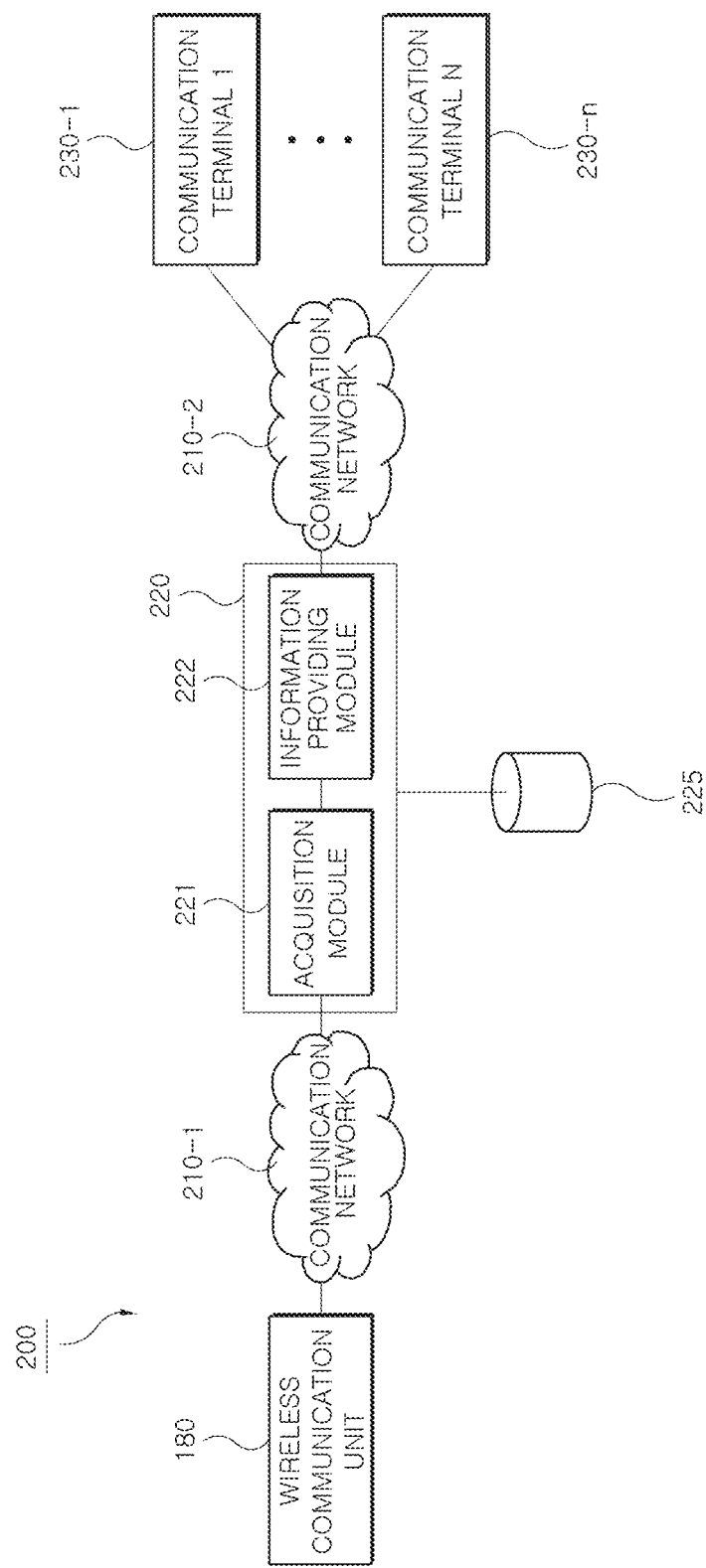
FIG. 2 is a block diagram showing a configuration of a big data based state diagnosis information providing system according to an exemplary embodiment of the present disclosure.

FIG. 2 is a block diagram of a configuration of a big data based state diagnosis information providing system 200 according to an exemplary embodiment of the present disclosure. Referring to FIG. 2, the big data based diagnosis information providing system 200 may include a vehicle 100, first and second communication networks 210-1, 210-2, a central server 220, first to $n^{th}$ communication terminals 230-1 to 230-$n$, and the like. The wireless communication unit 180 of the vehicle 100 may be connected with the central server 220 via the first communication network 210-1. Further, the first to $n^{th}$ communication terminals 230-1 to 230-$n$ may be communicatively connected with the central server 220 via the second communication network 210-2.

The first and second communication networks 210-1, 210-2 refer to a connection structure capable of exchanging information between the respective nodes such as a plurality of terminals and servers, and may be Public Switched Telephone Network (PSTN), Public Switched Data Network (PSDN), Integrated Services Digital Networks (ISDN), Broadband ISDN (BISDN), Local Area Network (LAN), Metropolitan Area Network (MAN), Wide LAN (WLAN), or the like. However, the present disclosure is not limited thereto, and may be Code Division Multiple Access (CDMA), Wideband Code Division Multiple Access (WCDMA), Wireless Broadband (Wibro), Wireless Fidelity (WiFi), High Speed Downlink Packet Access (HSDPA) network, Bluetooth, Near Field Communication (NFC) network, satellite broadcasting network, analog broadcasting network, Digital Multimedia Broadcasting (DMB) network, or the like, which is a wireless communication network. Alternatively, it may be a combination of these wired communication network and wireless communication network.

The central server 220 may be configured to include an acquisition module 221, an information providing module 222, and the like. The acquisition module 221 may be configured to acquire the diagnosis result information generated by the graphic controller 150 via the first communication network 210-1. The information providing module 222 may be configured to analyze and output the diagnosis result information.

The diagnosis result information, the analysis information, and the like may be stored in the database 225. The database 225 may be configured to store vehicle information, driver information of the vehicle, and the like. The driver information may be a name, a telephone number, an address, and the like, and the vehicle information may be a Vehicle Identification Number (VIN), a production year, a vehicle type, an engine type, and the like.

The database 225 may also be provided in the central server 220, and may be provided in a separate database server. The first to $n^{th}$ communication terminals 230-1 to 230-$n$ are terminals owned by a technical expert, and may be a mobile phone, a smart phone, a laptop computer, a digital broadcasting terminal, and a Personal Digital Assistants (PDA), a Portable Multimedia Player (PMP), navigation, a note pad, or the like. Therefore, the analysis information and the like may be output to the first to $n^{th}$ communication terminals 230-1 to 230-$n$ in a combination of graphic, voice, and text.

Figure 3:
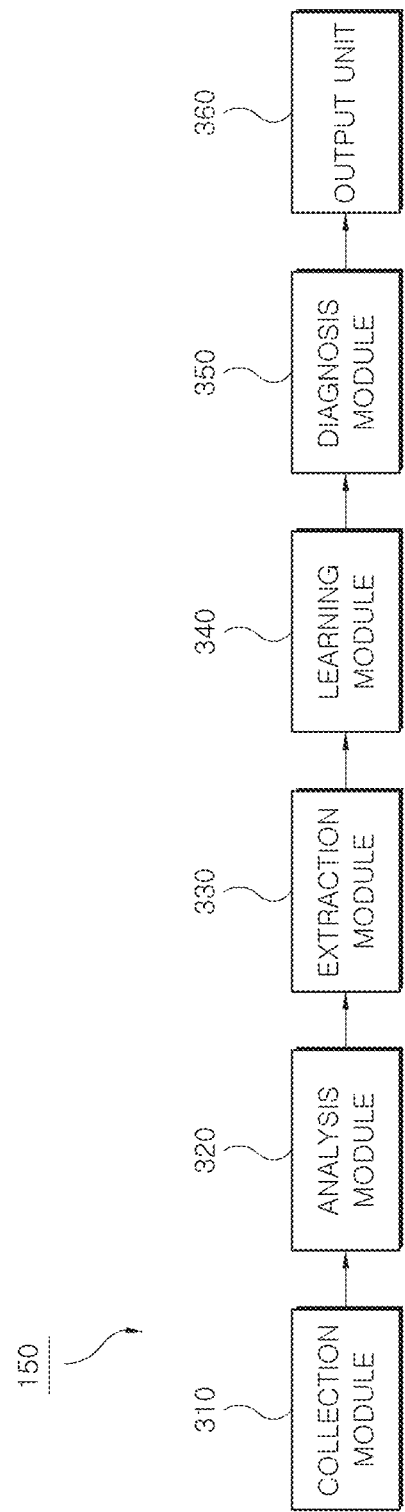
FIG. 3 is a block diagram showing a detailed configuration of a graphic controller shown in FIG. 1 according to an exemplary embodiment of the present disclosure.

FIG. 3 is a block diagram of a detailed configuration of the graphic controller 150 shown in FIG. 1. Referring to FIG. 3, the graphic controller 150 may include a collection module 310, an analysis module 320, an extraction module 330, a learning module 340, a diagnosis module 350, an output unit 360, and the like. The collection module 310 may be configured to collect the data generated by the sensing unit 120 and the engine controller 140. In other words, the collection module 310 may be configured to collect the vibration data, the noise data, and the in-vehicle communication message data to generate big data.

Further, the collection module 310 may be configured to additionally collect running pattern data of the driver, road data, traffic data, and the like. The running pattern data may include a safety distance, speeding, sudden acceleration, sudden deceleration, sudden stop, sudden start, and the like. The road data may be Global Positioning System (GPS) based road data. The traffic data represents the traffic volume. The road data and/or traffic data may be transmitted to the vehicle from the GPS system via the wireless communication unit 180.

The analysis module 320 may be configured to analyze characteristics by noise type in the collected big data. The extraction module 330 may be configured to extract a feature vector with respect to the analyzed data. The learning module 340 may be configured to perform primary classification by applying primary Deep Learning to the extracted feature vector. The diagnosis module 350 may be configured to generate the diagnosis result information by classifying the NVH into five classes using only the data determined as a normal state by applying secondary Deep Learning. The output unit 360 may be configured to output the generated diagnosis result information.

Further referring to FIG. 3, the diagnosis result information may be provided to the driver through the output unit 360. The diagnosis result information may include a combination of voice, text, and graphic. Accordingly, the output unit 360 may include a sound system, a display, and the like. The display may be a Liquid Crystal Display (LCD), a Light Emitting Diode (LED) display, an Organic LED (OLED) display, a touch screen, a flexible display, a Head Up Display (HUD), or the like. The output unit 360 may operate as an input device as well as outputting the information. In other words, if the output unit 360 is a touch screen, the driver may also input an execution command through the touch screen.

The term "~ module" described in FIGS. 2 and 3 refers to a device configured to process at least one function or operation, which may be implemented in software and/or hardware. In hardware implementation, it may be implemented by an application specific integrated circuit (ASIC), a digital signal processing (DSP), a programmable logic device (PLD), a field programmable gate array (FPGA), a processor, a microprocessor, other electronic units, or a combination thereof that are specifically programmed to execute the operations. In software implementation, it may include a software component (element), an object-oriented software component, a class component, and a task component, a process, a function, an attribute, a procedure, a subroutine, the segment of a program code, a driver, firmware, a microcode, data, databases, a data structure, a table, an array, and a variable. The software, the data, and the like may be stored in a memory and executed by a processor. The memory or the processor may adopt various devices well known to those skilled in the art.

Figure 4:
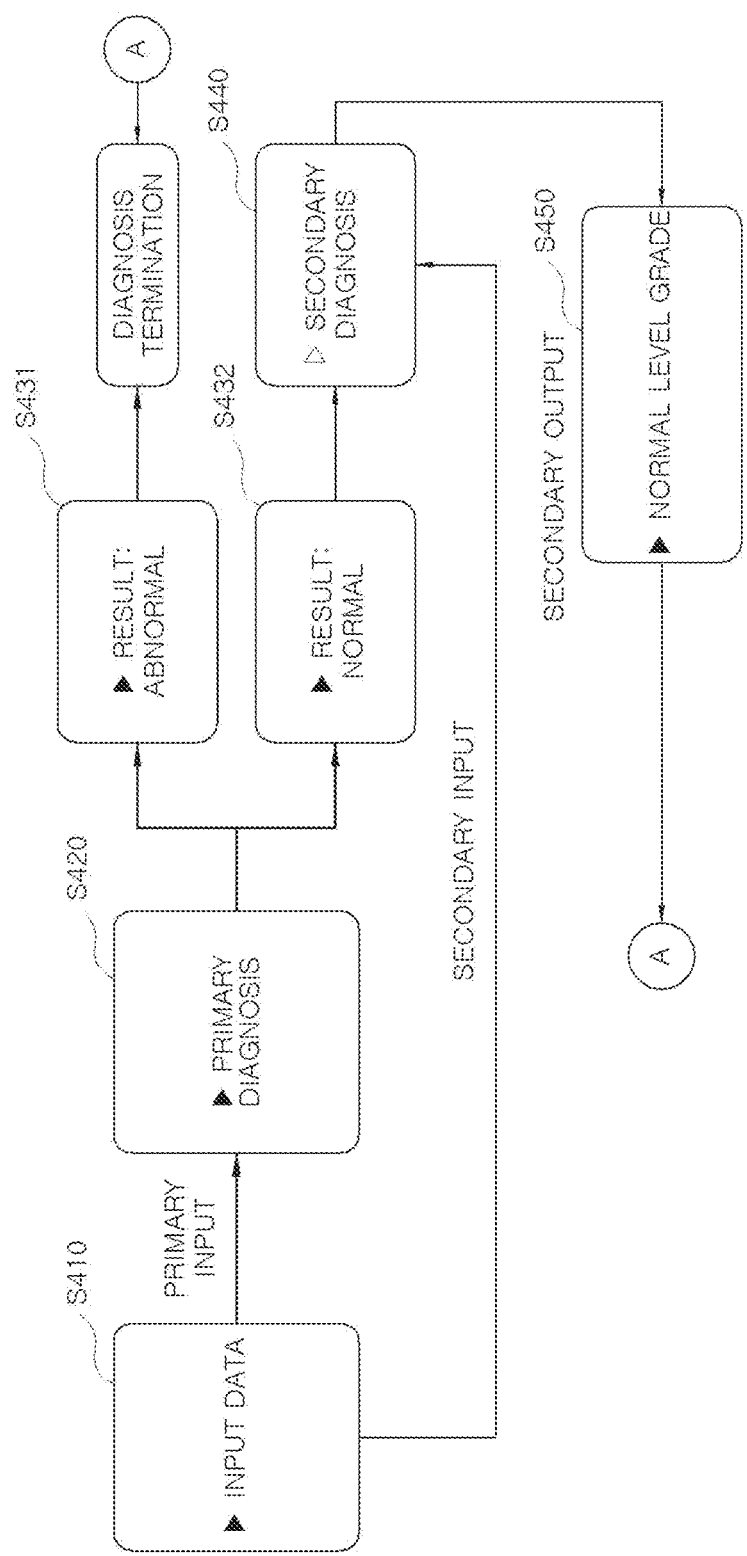
FIG. 4 is a flowchart showing a process of diagnosing a normal state or an abnormal state of the moving system part according to an exemplary embodiment of the present disclosure.

FIG. 4 is a flowchart showing a process of diagnosing a normal state or an abnormal state of a moving system parts according to an exemplary embodiment of the present disclosure. Referring to FIG. 4, big data including the noise data and the vibration data of the moving system parts of the engine 110 may be generated using the sensing unit 120. Subsequently, data corresponding to a filtering condition from the big data may be used as the input data (S410). The filtering condition may be, for example, three conditions. In other words, it may be ① idle noise, ② 2,000 revolution per minute (RPM), ③ 3,000 RPM. The specific engine RPM is an N stage racing condition at constant speed.

Primary diagnosis may be performed through a primary Deep Learning model with respect to the input data input primarily (S420). In other words, a feature vector may be acquired through Convolution Neural Network (CNN), a Max-pooling technique, a squeeze and excitation technique with respect to predetermined type of input data (e.g., the image data output during a predetermined time). In other words, the Convolution Neural Network (CNN) is convolution (3×3 filter)+Batch Normalization (BN)+Activation Function (ReLU), and applies a CNN×2 technique.

Subsequently, the squeeze and excitation technique and the Max-pooling (4×4) technique may be applied. Then, A CNN×3 may be sequentially applied again, and the squeeze and excitation technique and the Max-pooling (4×4) technique may be applied. Through the above, a feature vector may be acquired. The squeeze and excitation technique is a technique of highly setting a weight by highlighting the image feature which is important in the CNN image processing step.

Figure 5:
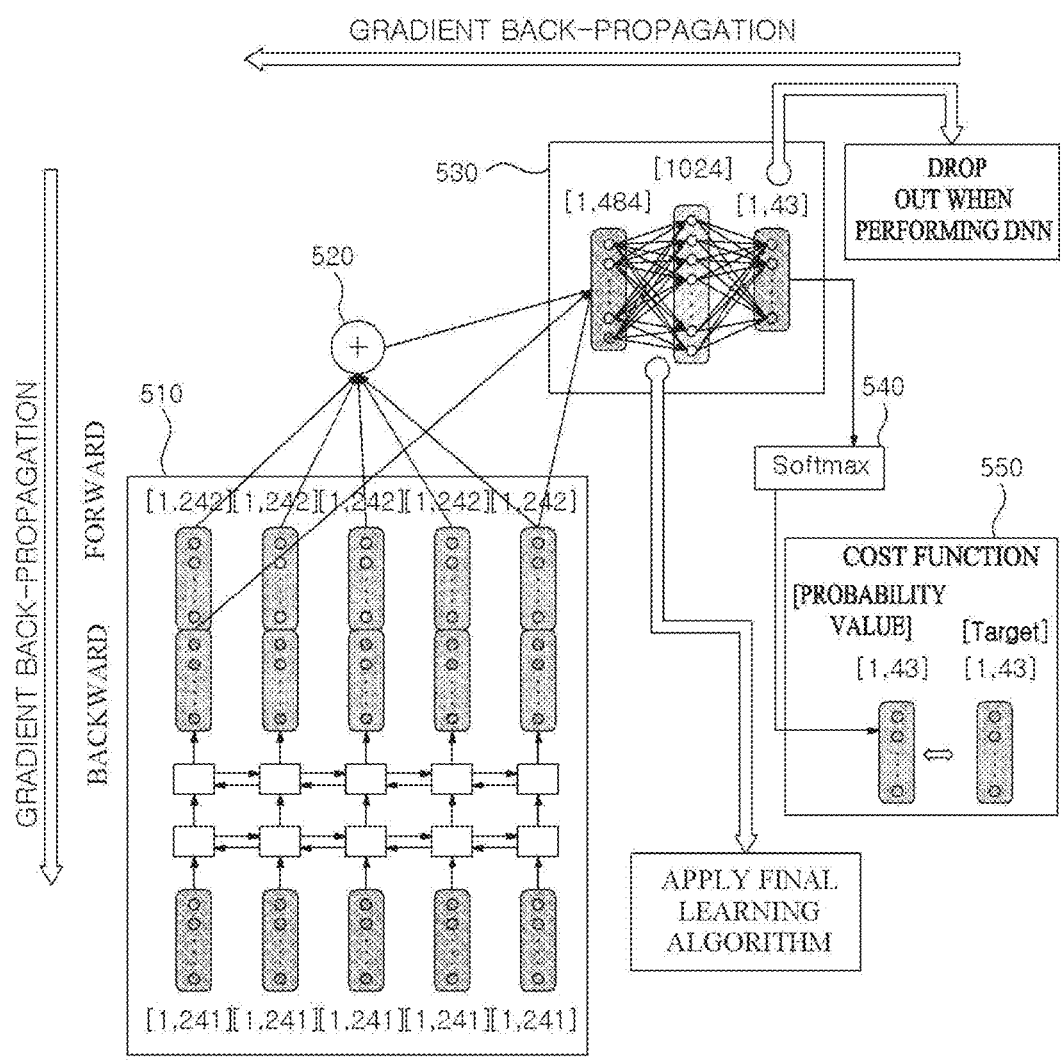
FIG. 5 is a conceptual diagram showing an algorithm of diagnosing a state of a Deep Learning based moving system according to an exemplary embodiment of the present disclosure.

Subsequently, primary classification may be performed on the feature vector by using a Deep Neural Network (DNN) model, which is a Deep Learning model. The Deep Learning model may include Recurrent Neural Network (RNN), Attention Mechanism, and Deep Neural Network (DNN), and the drawing showing the above is shown in FIG. 5. FIG. 5 will be described later. The RNN may be particularly a Gated Recurrent Unit (GRU).

The Deep Learning model may be generated using big data (e.g., noise and vibration) configured by classification model. The big data may include both abnormal noise/vibration data and normal noise/vibration data caused by the durability problem of the moving system parts. The abnormal noise/vibration data may include the noise/vibration data in the abnormal state caused by the moving system failure of the engine. In contrast, the normal noise/vibration data may include the noise/vibration data by mileage in the normal state according to the normal engine.

Further referring to FIG. 4, an abnormal state and a normal state may be determined by the primary diagnosis (S431, S432). As a criterion for determining the abnormal state, an abnormal state may be determined in response to diagnosing one or more of three noise data as abnormal. In response to determining the abnormal state, text indicating the abnormal state may be output, and diagnosis may be terminated by providing an announcement message such as the engine check or replacement. The announcement message may be a combination of text, voice, and graphic.

Figure 6B:
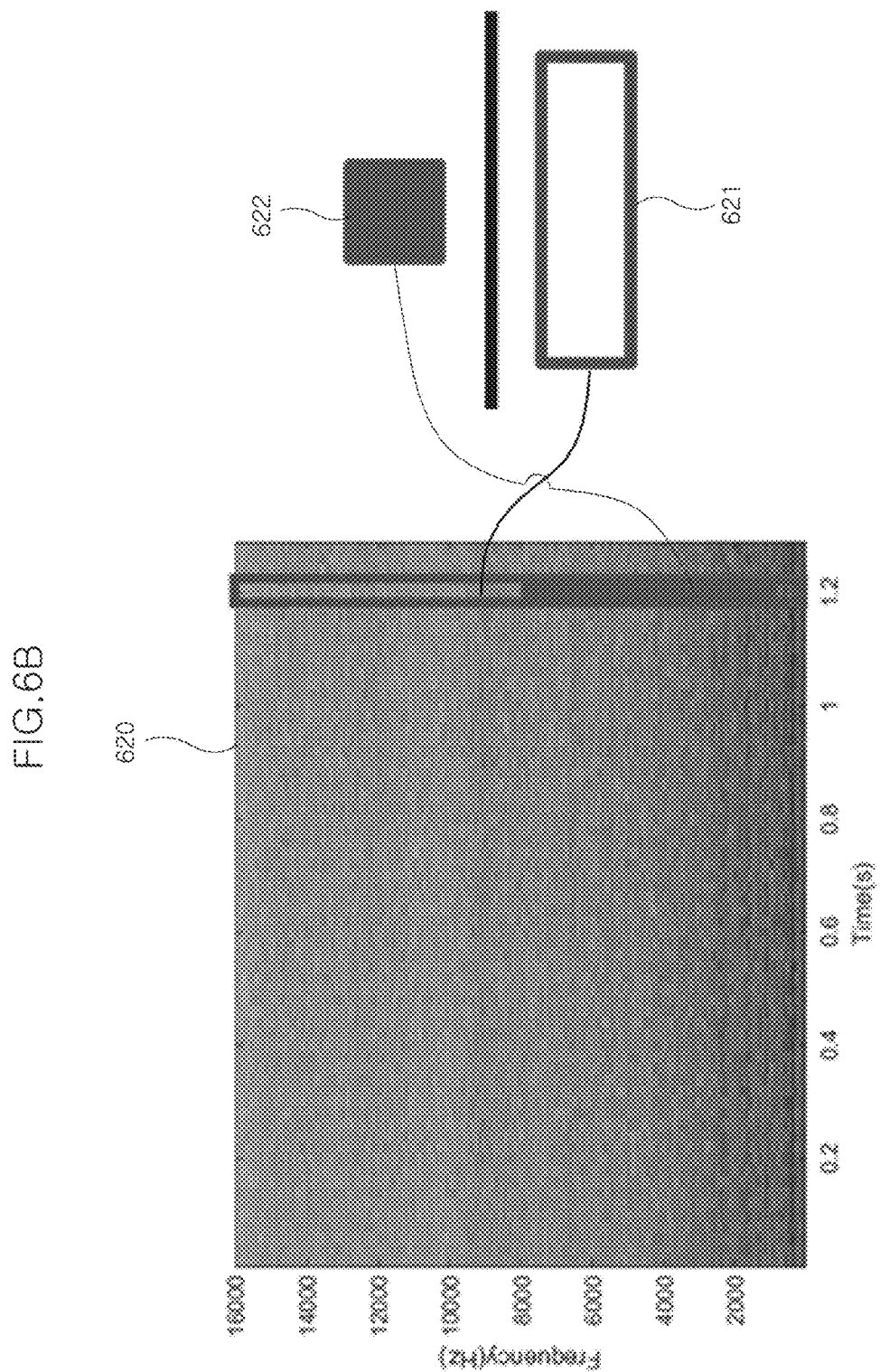

In response to determining the normal state, the character text indicating the normal state may be output, and the secondary diagnosis may be performed. In other words, the secondary diagnosis may be performed only on the noise/vibration data determined as the normal state (S440). For the secondary diagnosis, the input data used as the primary input as well as the data in the normal state may be used. The secondary diagnosis diagnoses the NVH level in the normal state. The diagram showing this secondary diagnosis is shown in FIGS. 6A to 6C. This will be described later.

Further referring to FIG. 4, a normal level grade may be calculated by the secondary diagnosis (S450). The normal level grade is expressed as scores as shown in Table 1 below. Table 1

TABLE 1

| Grade | 1 | 2 | 3 | 4 | 5 |
|---|---|---|---|---|---|
| Score | 0.00~0.19 | 0.20~0.39 | 0.40~0.59 | 0.60~0.79 | 0.80~1.00 |

FIG. 5 is a conceptual diagram showing an algorithm for diagnosing a state of a Deep Learning based moving system according to an exemplary embodiment of the present disclosure. Referring to FIG. 5, an Attention mechanism of forward and backward may be applied to a node (e.g., big data) in the big data alignment block 510. After this Attention mechanism has been applied, a node ($w_{alt}(t)$) may be weight-summed by a summation device 520 to be input to the Input layer of a DNN block 530. The values input to the Input layer by the Deep Neural Network (DNN) may be output from an Output layer to calculate a probability value in an output block 550 through a Softmax function block 540. In the output block 550, an average value (J) of all inputs may be calculated as expressed in the equation below.

$$J(w) = -\frac{1}{N}\sum\left[y_n\log\hat{y}_n(1-y_n)\log(1-\hat{y}_n)\right] \quad \text{Equation 1}$$

wherein the w refers to a weight and bias parameter, the N refers to a batch size, the $y_n$ refers to a target value, and the $\hat{y}_n$ refers to an output value.

Drop out when performing the DNN may occur. It is applied only to a 1-layer structure, and since learning may be performed by randomly cutting the nodes as much as a Drop rate when performing the epoch, the effect to ensemble various models occur. In other words, over fitting may be prevented and diagnosis accuracy may be improved. Particularly, [1,484] indicates that 242 node data (e.g., big data) are extracted through bidirectional RNN (GRU) learning. Further, as a result of having performed the Bi-direction for 121 node data, a double early stage ensemble algorithm may be applied. Therefore, 484 node information may be acquired by merging 242 node information at the start time and 242 node data information at the end time. Gradient back-propagation is an adam optimizer.

FIGS. 6A to 6C are conceptual diagrams showing diagnosis of Noise, Vibration, Harshness (NVH) level in the normal state according to an exemplary embodiment of the present disclosure. FIG. 6A is a conceptual diagram of calculating an energy relative ratio ($measure_1$) in a frequency band in which the percussive is generated in the moving system parts at a predetermined certain level or more. Referring to FIG. 6A, a relative ratio may be calculated by dividing a portion 612 where the percussive is generated from a spectrogram 610 according to the noise or vibration data by a remaining portion 611.

FIG. 6B is a conceptual diagram of calculating an energy relative ratio ($measure_2$) in a frequency band which governs the sound pressure (e.g., representing the intensity of the noise) in low frequency to high frequency bands in the moving system parts. Referring to FIG. 6B, a relative ratio may be calculated by dividing a portion 622 where the sound pressure is generated from the spectrogram 620 according to the noise or vibration data at a predetermined certain level or more by the remaining portion 621.

FIG. 6C is a conceptual diagram of classifying only the percussive sound component in a problematic corresponding frequency band using a Harmonic-Percussive Source Separation (HPSS) algorithm to calculate a result value ($measure_3$). Referring to FIG. 6C, the result value of the relative ratio may be calculated by generating a filtered spectrogram 630 where the percussive sound is generated in the spectrogram 610, and dividing the spectrogram 630 separated and filtered into a harmonic component 632 and a percussive component 631 by using the HPSS algorithm from the spectrogram 630 by the percussive component 631.

In general, the Harmonic-Percussive Source Separation (HPSS) algorithm separates it into an H component which is a harmonic component and a P component which is a percussive sound component on the frequency axis after Short Time Fourier Transform (STFT). In other words, the H component may be separated by applying a Horizontal median filter along the frequency axis, and the P component may be separated by applying a Vertical median filter along the time axis. A binary mask may be generated by applying a threshold value to a H/P or P/H ratio. Therefore, Element-wise multiplication may be performed on the STFT coefficient and the binary mask of an input signal to finally separate the H component and the P component.

Further referring to FIGS. 6A to 6C, a normal level grade may be expressed by an energy relative ratio in the frequency band in which the percussive among the state data is generated larger than a predetermined reference value, an energy relative ratio in the frequency band which governs the sound pressure in the low frequency to high frequency bands, and a score summed by multiplying an extracted result value extracted by classifying only the percussive component in the corresponding frequency band by each weight. This may be expressed as an equation as follows.

$$\text{Score} = (\alpha \cdot measure_1 + \beta \cdot measure_2 + \gamma \cdot measure_3 /2 \quad \text{Equation 2}$$

where $$\alpha = 0.5, \beta = 0.5, \gamma = 1.0$$

Further, $measure_1$: max (1.5 to 4 kHz frequency band energy/total frequency band energy), $measure_2$: max (0.5 to 8 kHz frequency band energy/total frequency band energy), $measure_3$: max (specific frequency band energy of the P component/specific frequency band strength of the original signal). The respective measures may be min-max normalized to a value between 0 and 1. In other words, the min and max values in the training data are used.

Figure 7:
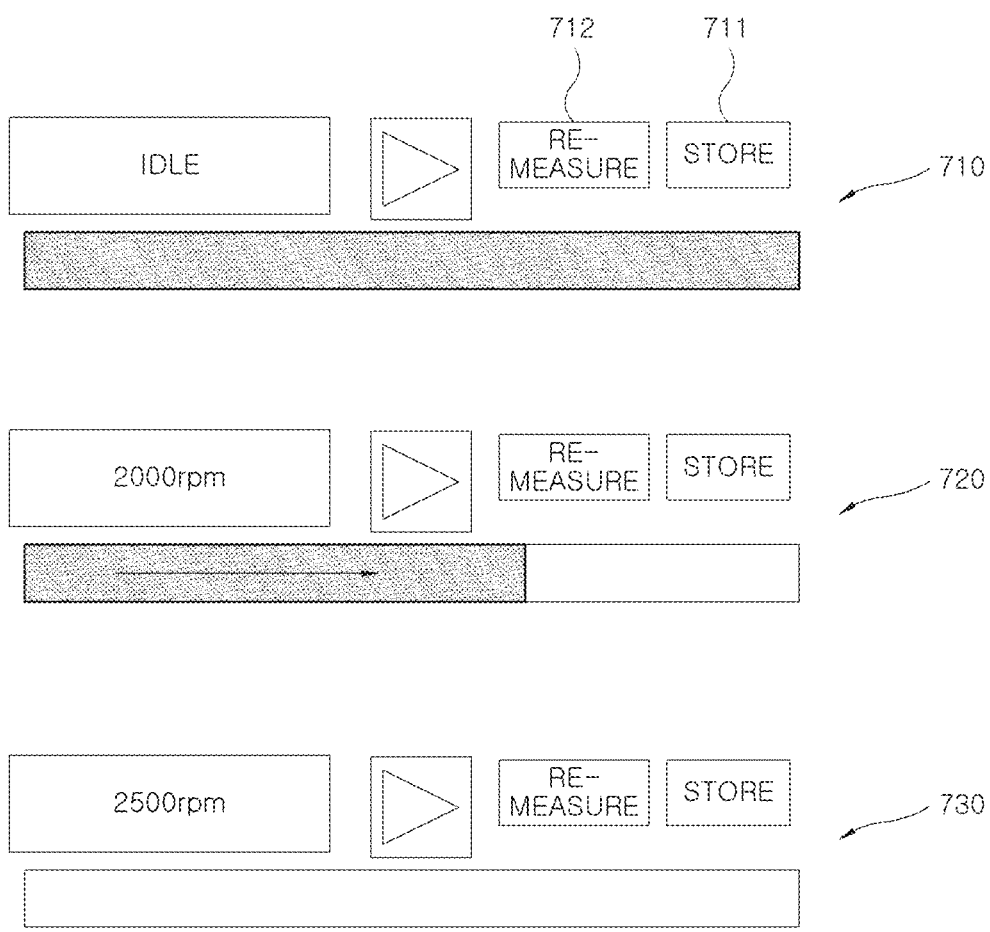
FIG. 7 is a diagram showing a screen example of displaying the success and failure of the noise measurement according to an exemplary embodiment of the present disclosure.

FIG. 7 is a diagram showing a screen example representing the success and failure of the noise measurement according to an exemplary embodiment of the present disclosure. Referring to FIG. 7, the idle may be maintained in a space with less external noise, and may be automatically measured in a state of maintaining about 2,000 RPM and 2500 RPM for 3.0 seconds. The 3.0 second measurement for each condition may be indicated as "success," "under during measurement," and "failure" in the time flow bar format 710, 720, 730. In response to a "success," the "save" button 711 may be selected to be stored, and in response to "failure," the automatic measurement may be performed again by selecting a "re-measure" button 712. The data required for storage may be idle/2,000/2,500 RPM noise and 3.0 seconds, and the engine RPM information may be unnecessary for diagnosis. Meanwhile, this measurement may be performed under a constant speed condition. The constant speed condition range (e.g., engine RPM) may be a target RPM of ±100 RPM.

Figure 8:
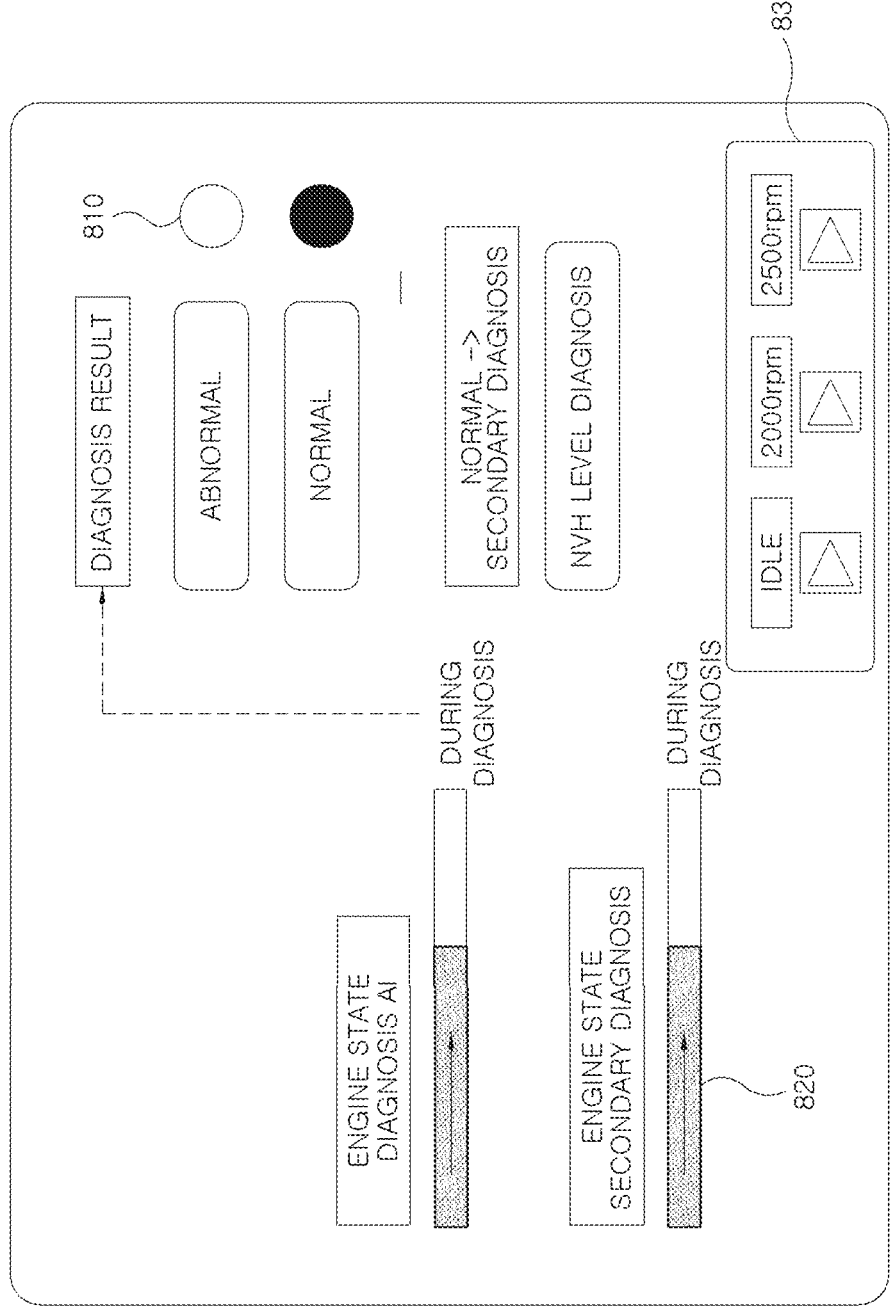
FIG. 8 is a diagram showing a configuration example for a primary diagnosis result of a Graphic User Interface (GUI) for diagnosis application according to an exemplary embodiment of the present disclosure.

FIG. 8 is a diagram showing a configuration example of a primary diagnosis result of a Graphic User Interface (GUI) for diagnosis application according to an exemplary embodiment of the present disclosure. Referring to FIG. 8, an "abnormal" and "normal" display window 810 on the screen may be turned on according to the diagnosis result. If the secondary diagnosis has been selected at the primary diagnosis, a secondary diagnosis active window 820 may be displayed. Further, a rehearing execution button 830 may be configured to enable rehearing (e.g., repeat output) even when switched to the diagnosis after the measurement. Therefore, the memory of the noise may be updated.

Figure 9:
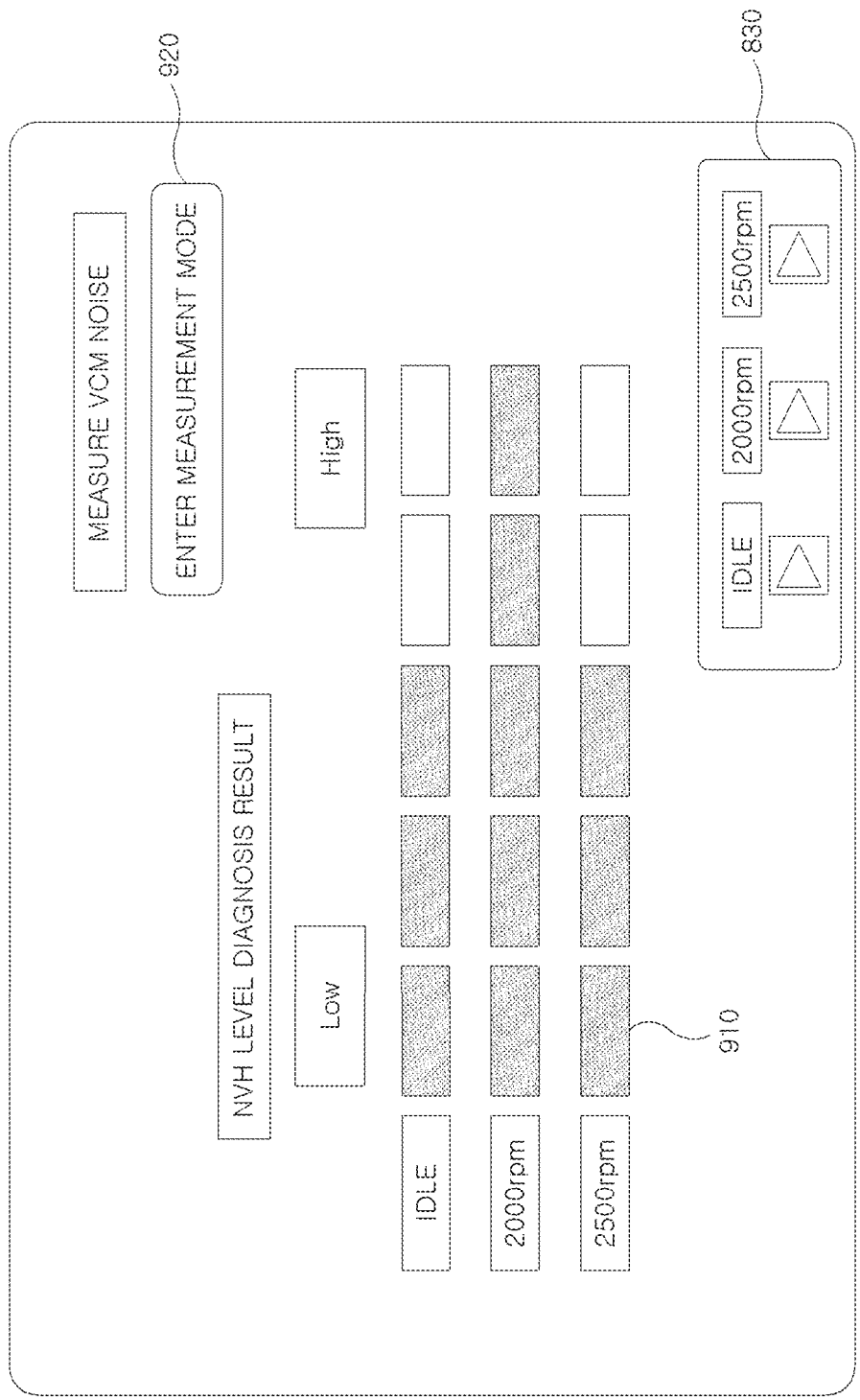
FIG. 9 is a diagram showing a configuration example for a secondary diagnosis result of a Graphic User Interface (GUI) for diagnosis application according to an exemplary embodiment of the present disclosure.

FIG. 9 is a diagram showing a configuration example of a secondary diagnosis result of the Graphic User Interface (GUI) for diagnosis application according to an exemplary embodiment of the present disclosure. Referring to FIG. 9, the secondary diagnosis result may be displayed on the screen. The normal level grade may be displayed as a bar type result output 910. Further, an "enter measurement mode" button 920 may be configured to execute a variable cylinder management (VCM) evaluation mode which adds an acceleration condition for more accurate re-measurement. If the "enter measurement mode" button 920 is selected, is the display may be switched to the noise measurement screen.

Further, the steps of a method or algorithm described in connection with the embodiments disclosed herein may be implemented in the form of program instructions which may be performed by various computer such as a microprocessor, a processor, and a Central Processing Unit (CPU) to be recorded on a non-transitory computer readable medium specifically programmed to execute the method. The non-transitory computer readable medium may include a program (instruction) code, a data file, a data structure, and the like alone or in combination.

The program (instruction) code recorded on the medium may be those specially designed and constructed for the present disclosure. Examples of the non-transitory computer-readable recording media include magnetic media such as a hard disk, a floppy disk, and a magnetic tape, optical media such as a CD-ROM, a DVD, and a Blu-ray, and semiconductor memory elements specifically configured to store and execute the program (instruction) code, such as a ROM, a RAM, and a flash memory.

Here, examples of the program (instruction) code include not only a machine code generated by a compiler, but also a high-level language code which may be executed by a computer using an interpreter or the like. The hardware device described above may be configured to operate as one or more software modules to perform the operations of the present disclosure, and vice versa.

What is claimed is:

1. A state diagnosis apparatus of a moving system part, comprising:
   a sensor unit configured to measure and collect state data of a moving system part relevant to an engine; and
   a graphic controller configured to:
      primarily diagnose classification data generated by classifying the state data based on a predetermined filtering condition as a normal state or an abnormal state using a Deep Learning model, and
      perform secondary diagnosis to calculate a normal level grade in response to diagnosing the normal state.

2. The state diagnosis apparatus of the moving system part of claim 1, wherein the state data includes noise data and vibration data of the moving system part.

3. The state diagnosis apparatus of the moving system part of claim 2, wherein the state data includes noise data and vibration data of the abnormal state generated by a failure of the moving system part, and includes noise data and vibration data by mileage according to the normal state of the engine.

4. The state diagnosis apparatus of the moving system part of claim 3, wherein the state data is collected when the engine is an idle condition and a predetermined constant speed.

5. The state diagnosis apparatus of the moving system part of claim 1, wherein the Deep Learning model is a structure including Recurrent Neural Network (RNN), Attention Mechanism, and Deep Neural Network (DNN).

6. The state diagnosis apparatus of the moving system part of claim 1, wherein the normal level grade is a value based on a Noise, Vibration, Harshness (NVH) level of the engine.

7. The state diagnosis apparatus of the moving system part of claim 6, wherein the normal level grade is expressed by an energy relative ratio in a frequency band in which percussive among the state data is generated larger than a predetermined reference value, an energy relative ratio in a frequency band which governs sound pressure of low frequency to high frequency bands, and a score summed by multiplying an extracted result value extracted by classifying a percussive sound component in the corresponding frequency band by each weight.

8. The state diagnosis apparatus of the moving system part of claim 7, wherein the extracted result value is calculated using a Harmonic-Percussive Source Separation (HPSS) algorithm.

9. The state diagnosis apparatus of the moving system part of claim 1, wherein the graphic controller is configured to execute a variable cylinder management (VCM) evaluation mode which adds an acceleration condition for re-measuring the state information.

10. The state diagnosis apparatus of the moving system part of claim 1, wherein the engine is an internal combustion engine, an electric motor, a gas turbine, or an electric generator.

11. A state diagnosis method of a moving system part, comprising:
    collecting, by a sensor unit, state data of a moving system part relevant to an engine;
    classifying, by a graphic controller, the state data based on a predetermined filtering condition to generate classification data;
    primarily diagnosing, by the graphic controller, the classification data as a normal state or an abnormal state using a Deep Learning model, and
    performing, by the graphic controller, secondary diagnosis to calculate a normal level grade in response to diagnosing the normal state.

12. The state diagnosis method of the moving system part of claim 11, wherein the state data includes noise data and vibration data of the moving system part.

13. The state diagnosis method of the moving system part of claim 12, wherein the state data includes noise data and vibration data of the abnormal state generated by a failure of the moving system part, and includes noise data and vibration data by mileage according to the normal state of the engine.

14. The state diagnosis method of the moving system part of claim 13, wherein the state data is collected when the engine is an idle condition and a predetermined constant speed.

15. The state diagnosis method of the moving system part of claim 11, wherein the Deep Learning model is a structure including Recurrent Neural Network (RNN), Attention Mechanism, and Deep Neural Network (DNN).

16. The state diagnosis method of the moving system part of claim 11, wherein the normal level grade is a value based on a Noise, Vibration, Harshness (NVH) level of the engine.

17. The state diagnosis method of the moving system part of claim 16, wherein the normal level grade is expressed by an energy relative ratio in a frequency band in which percussive sound is generated larger than a predetermined reference value among the state data, an energy relative ratio in a frequency band which governs sound pressure of low frequency to high frequency bands, and a score summed by multiplying an extracted result value extracted by classifying the percussive sound component in the corresponding frequency band by each weight.

18. The state diagnosis method of the moving system part of claim 11, wherein the engine is an internal combustion engine, an electric motor, a gas turbine, or an electric generator.

* * * * *